(12) United States Patent　　(10) Patent No.: US 6,655,199 B1
Smith　　(45) Date of Patent: Dec. 2, 2003

(54) ELECTRONIC FOOT PEDAL VEHICLE CONTROL SYSTEM

(75) Inventor: Rex L. Smith, 4710 Surfwood, Commerce Township, MI (US) 48382

(73) Assignee: Rex L. Smith, Commerce Township, MI (US)

(*) Notice: Subject to any disclaimer, the term of this patent is extended or adjusted under 35 U.S.C. 154(b) by 0 days.

(21) Appl. No.: 10/175,713

(22) Filed: Jun. 20, 2002

Related U.S. Application Data

(63) Continuation of application No. 09/607,221, filed on Jun. 30, 2000, now abandoned.

(51) Int. Cl.⁷ .............................................. G01M 15/00
(52) U.S. Cl. ...................................... 73/118.1; 73/768
(58) Field of Search .............................. 73/116, 117.2, 73/117.3, 118.1, 119 R, 760, 763, 768, 774

(56) References Cited

U.S. PATENT DOCUMENTS

| | | |
|---|---|---|
| 4,141,248 A | 2/1979 | Bargenda |
| 4,206,636 A | 6/1980 | Hendrix |
| 4,640,248 A | 2/1987 | Stoltman |
| 4,881,502 A | 11/1989 | Kabasin |
| 4,888,997 A | 12/1989 | Eckert et al. |
| 4,970,486 A | 11/1990 | Gray et al. |
| 4,976,166 A | 12/1990 | Davis et al. |
| 5,115,162 A * | 5/1992 | Leonard et al. .............. 310/339 |
| 5,193,506 A * | 3/1993 | Ironside et al. .............. 123/399 |
| 5,385,068 A | 1/1995 | White et al. |
| 5,563,355 A * | 10/1996 | Pluta et al. ............ 73/862.625 |
| 5,675,094 A | 10/1997 | Klauber et al. |
| 5,915,281 A | 6/1999 | Sparks |
| 6,031,448 A | 2/2000 | Starkweather et al. |
| 6,542,793 B2 * | 4/2003 | Kojima et al. .................. 701/1 |
| 2002/0056337 A1 * | 5/2002 | Sundaresan et al. .......... 74/513 |

* cited by examiner

*Primary Examiner*—Eric S. McCall
(74) *Attorney, Agent, or Firm*—Reising, Ethington, Barnes, Kisselle, P.C.

(57) ABSTRACT

An electronic foot pedal vehicle control system includes a foot pedal of rigid one-piece molded plastic construction having a base and a pedal arm cantilevered from the base. An electronic subassembly is insert molded into the base of the foot pedal, and includes a force sensor disposed in the base adjacent to the pedal arm for providing an electrical sensor signal as a function of force applied to the pedal arm by a vehicle operator. Electronic circuitry is responsive to the sensor signal for providing a pedal output signal to control at least one variable of vehicle operation. The electronic circuitry preferably has programmed hysteresis characteristics so as to allow limited force variation on the pedal without changing the output signal from the electronic circuitry.

18 Claims, 1 Drawing Sheet

US 6,655,199 B1

ELECTRONIC FOOT PEDAL VEHICLE CONTROL SYSTEM

This application is a continuation-in-part of application Ser. No. 09/607,221 filed Jun. 30, 2000 now abandoned.

The present invention is directed to systems for controlling at least one parameter of automotive vehicle operation, such as engine and brake control systems, and more particularly to an electronic foot pedal with integrated electronics responsive to forces applied to the pedal by a vehicle operator.

BACKGROUND AND SUMMARY OF THE INVENTION

Automotive vehicle foot pedals, such as accelerator and brake control pedals, have typically been mechanically coupled to devices for controlling vehicle operation, such as an engine throttle or an hydraulic brake control cylinder. It has been proposed to replace such mechanical coupling with electronic sensors, such as variable resistors responsive to movement of a spring-biased pedal. However, such systems are not entirely satisfactory in that they are subject to manufacturing variables and require components, such as springs or the like, to provide mechanical hysteresis at the pedal. In vehicle accelerator applications, for example, it is desirable to allow movement of the accelerator over a limited range without changing vehicle throttle position. In mechanical and electrical systems heretofore proposed, this hysteresis requires inclusion of mechanical components, undesirably increasing the cost of the overall system. It is therefore a general object of the present invention to provide an electronic foot pedal vehicle control system that is characterized by reduced cost and complexity, that can be readily electronically programmed for differing vehicle characteristics so that a single foot pedal system can be employed in a number of differing vehicle models, that can be employed in either vehicle accelerator or vehicle brake control applications, and/or that is characterized by reduced cost and complexity as compared with foot pedal systems of the prior art.

An electronic foot pedal vehicle control system in accordance with a presently preferred embodiment of the invention includes a foot pedal for securement to a vehicle at a position to be responsive to forces applied by the foot of a vehicle operator. A force sensor is coupled to the pedal for providing an electrical sensor signal as a function of force applied to the pedal by the vehicle operator and independent of movement at the pedal. Electronic circuitry is responsive to the sensor signal for controlling at least one variable of vehicle operation—e.g., engine throttle or brake control. In the preferred embodiment of the invention, the electronic circuitry has electronically programmed hysteresis characteristics, most preferably in the form of a variably programmable digital microcomputer. The foot pedal preferably is of molded plastic construction, with the sensor and electronic circuitry preferably being insert molded as a subassembly into the base of the foot pedal. A electrical connector preferably is disposed on an external surface of the pedal for selective electrical connection to vehicle control electronics, such as an engine or brake control unit. The foot pedal is preferably of rigid one-piece construction and adapted for fixed securement to a vehicle, so that the pedal does not move and is responsive solely to forces applied thereto by a vehicle operator.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
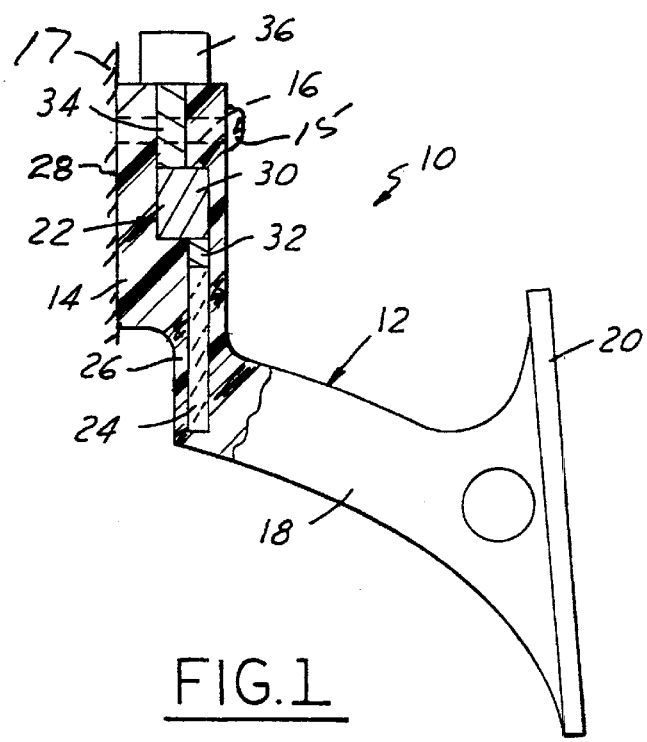
FIG. 1 is a partially sectioned side elevational view of an electronic foot pedal vehicle control system in accordance with a presently preferred embodiment of the invention.
Figure 2:
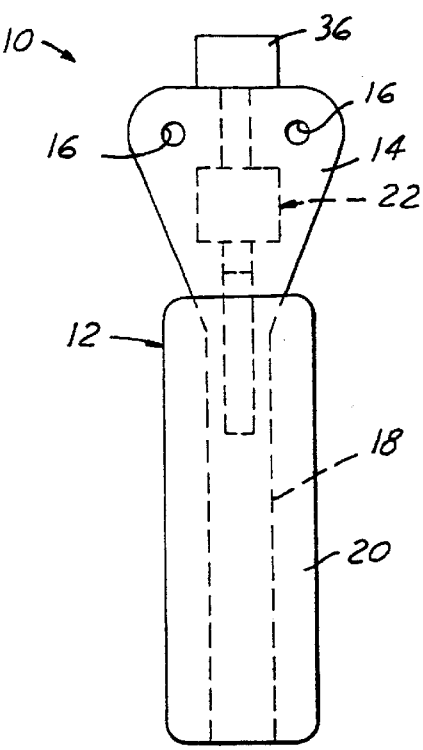
FIG. 2 is a front elevational view of the system illustrated in FIG. 1.
Figure 3:
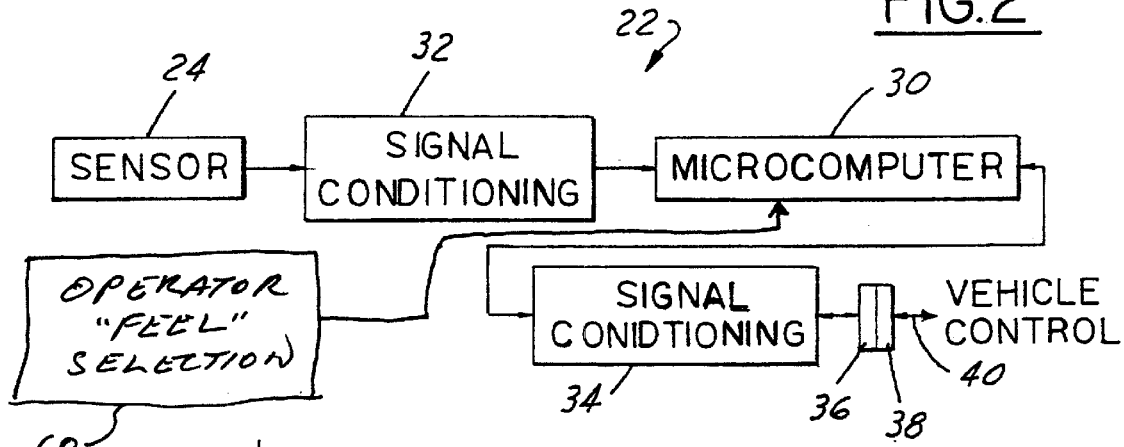
FIG. 3 is an electrical functional block diagram of the system illustrated in FIGS. 1 and 2.

FIGS. 1–3 illustrate an electronic foot pedal vehicle control system 10 in accordance with a presently preferred embodiment of the invention as comprising a foot pedal 12 of one-piece integrally molded plastic construction. Foot pedal 12 has a base 14 with a pair of spaced openings 16 for receiving screws or the like 15 to secure base 14 at fixed position within an automotive vehicle, such as on the floor 17 of a vehicle at the vehicle operator position. A pedal arm 18 is cantilevered from base 14, preferably from an end of base 14, and terminates in a pad 20 for engagement by the foot of a vehicle operator. In the illustrated embodiment, pad 20 is an integral part of pedal 12. Pad 20 alternatively may be of rubber construction molded or otherwise assembled onto the end of arm 18. An electronic subassembly 22 is insert molded into base 14 of pedal 12. Electronic subassembly 22 includes a force sensor 24 disposed within base 14 immediately adjacent to pedal arm 18, and responsive to forces applied to pedal arm 18 for providing an electrical sensor signal. Sensor 24 may comprise any suitable stress sensor, such as a magnetoelectric sensor, a piezoelectric sensor or a semiconductor sensor. It will be noted in FIG. 1 that sensor 24 extends into a portion 26 of base 14 that is spaced from the mounting surface 28 of base 14 so that portion 26 of the pedal base and arm surrounding sensor 24 can (but need not) flex to a limited extent responsive to forces applied to the pedal by the vehicle operator. However, sensor 24 is responsive solely to force applied to the brake pedal, such as by being responsive to the resulting strain in pedal arm 18 and/or base portion 26, and not to any flexural movement of pad 20 or arm 18, which would be of limited extent in any event.

Electronic subassembly 22 also includes a programmed microcomputer 30 that receives the output signal from sensor 24 through suitable signal conditioning circuitry 32. Microcomputer 30 is preprogrammed to provide an output signal through signal conditioning circuitry 34 to an output connector 36 as a controlled function of the input signal provided thereto from sensor 24. For example, microcomputer 30 may provide a pulse-width modulated output control signal suitable for application to an hydraulic brake solenoid valve in brake control applications of the present invention. Microcomputer 30 alternatively may be programmed to provide a DC output at a level proportional to the input signal from sensor 24 or a digital output proportional to such sensor input signal to an engine control unit or ECU for controlling an engine throttle or other engine control device in an accelerator pedal application of the invention. Microcomputer 30 preferably is preprogrammed—i.e., prior to insert molding into the pedal. Alternatively, microcomputer 30 can be connected to receive input signals from connector 36 through signal conditioning circuit 34 for programming one or more control variables at microcomputer 30 in the field or during maintenance and repair of the vehicle. Connector 36 is, of course, adapted for connection to other vehicle control electronics by means of a suitable mating connector 38 and a suitable cable 40.

Figure 4:
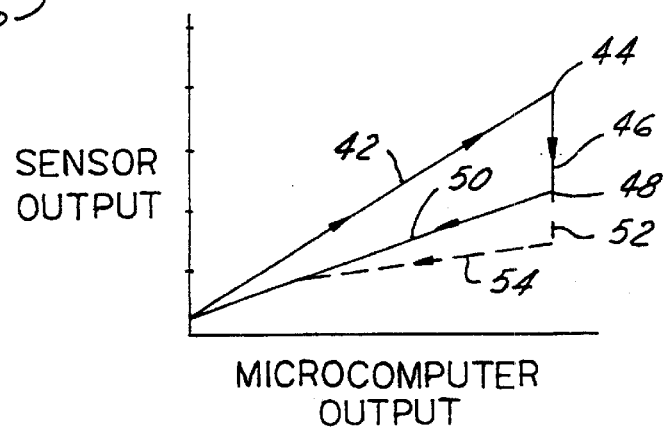
FIG. 4 is a graph that illustrates exemplary hysteresis characteristics of the system illustrated in FIGS. 1–3.

Microcomputer 30 preferably is programmed to provide electrically controlled hysteresis characteristics in the microcomputer output signal as a function of the input signal from sensor 24. This capability of electronically preprogramming hysteresis characteristics in the brake or accelerator pedal control system provides the capability of simulating the mechanical hysteresis characteristics of conventional pedal control systems, and thereby providing the operator with a familiar "feel" at the pedal. An example of such hysteresis characteristics is illustrated in FIG. 4. For example, microcomputer 30 may be programmed to provide an output signal as a function of increasing sensor output signal along the path 42 up to the maximum output level 44. Operator pressure on the foot pedal and the sensor output may decrease along the path 46 to the point 48 without a change in microcomputer output, after which the microcomputer output returns to the minimum; output along the path 50. This hysteresis characteristic thus allows a change in force on the pedal over the limited range between points 44 and 48 without changing the microcomputer output to the vehicle brakes. FIG. 4 also illustrates how the hysteresis characteristics are selectively variable, as along the paths 52, 54. Indeed, it is not necessary that the microcomputer output be linearly related to the input signal from the sensor, and the microcomputer output can be related to sensor input signal by means of a look-up table or the like that would permit variation in microcomputer output due to other parameters. For accelerator applications in particular, it is common practice in the industry to require four pounds of operator pressure before breaking away from idle, and twelve pounds of operator pressure for a wide-open-throttle condition. Hysteresis along path 46 could correspond to two pounds of operator foot pressure as noted above. The described electrically controlled hysteresis characteristics preferably are preprogramed in microcomputer 30. As an alternative, the hysteresis characteristics may selectively be alterable by an operator through an operator input 60 to provide a desired "feel" at he pedal.

There has thus been disclosed an electronic foot pedal vehicle control system that fully satisfies all of the objects and aims previously set forth. The system of the present invention differs from the prior art in that the brake pedal is non-movably mounted within the vehicle (ignoring whatever limited flexure may take place in the pedal arm, which has no effect on system operation. In any event, the force sensor of the present invention provides an output signal to the control electronics in response to force applied to the brake pedal, and independent of any minor flexural movement of the pedal.) In the preferred embodiment of the invention, the system is integrated into a single pedal assembly, with associated electronics insert molded into the pedal. The electronic circuitry includes facility for programming hysteresis characteristics, either preprogrammed into the control electronics or variably programmable in the field. The brake pedal and associated electronics are thus provided as a completed assembly, which may be fully programmed by the supplier and thus ready for installation by the automotive manufacturer without further adjustment. This variable programmability feature would also be useful in a repair environment in that a single pedal could be stocked for repair purposes and tailored to specific vehicle models at the time of installation into a vehicle. The programmability feature can also be used to tailor pedal feel and response to a particular operator. Although the invention has been disclosed in conjunction with a digitally programmed microcomputer in the preferred embodiment of the invention, it will be recognized that such digital circuitry could be replaced by suitable analog circuitry, particularly where the pedal is targeted for a particular vehicle at the time of manufacture. It is also preferred that the pedal be of non-movable construction—i.e., that the pedal does not move responsive to operator pressure other than the small amount of flexure associated with absorption of stress in the pedal arm. Other modifications and variations will readily suggest themselves to persons of ordinary skill in the art. The invention is intended to embrace all such modifications and variations as fall within the spirit and broad scope of the appended claims.

What is claimed:

1. An electronic foot pedal vehicle control system that comprises:

a foot pedal including means for securement to a vehicle at a position to be responsive to forces applied by a foot of a vehicle operator, said pedal being of rigid construction, and said securement means being adapted to secure said pedal in fixed non-movable position on a vehicle;

a force sensor coupled to said pedal for providing an electrical sensor signal as a function of force applied to said pedal by a vehicle operator and independent of movement of said pedal, and means responsive to said electrical sensor signal for controlling at least one variable of vehicle operation.

2. The system set forth in claim 1 wherein said signal responsive means comprises electronic circuitry having electrically programmed hysteresis characteristics allowing a change in force on said pedal over a limited range without changing said variable of vehicle operation at said means responsive to said electrical sensor signal.

3. An electronic foot pedal vehicle control system that comprises:

a foot pedal including means for securement to a vehicle at a position to be responsive to forces applied by a foot of a vehicle operator, a force sensor coupled to said pedal for providing an electrical sensor signal as a function of force applied to said pedal by a vehicle operator and independent of movement of said pedal, and means responsive to said electrical sensor signal for controlling at least one variable of vehicle operation, said signal responsive means comprising electronic circuitry having electrically programmed hysteresis characteristics allowing a change in force on said pedal over a limited range without changing said variable of vehicle operation at said means responsive to said electrical sensor signal.

4. The system set forth in claim 3 wherein said electronic circuitry includes a programmed microcomputer that is electrically programmed to provide said hysteresis characteristics.

5. The system set forth in claim 3 wherein said foot pedal is of one-piece molded plastic construction, and said sensor and said electronic circuitry are insert molded in said pedal.

6. The system set forth in claim 5 wherein said electronic circuitry includes a connector disposed on an external surface of said pedal for selective electrical connection to vehicle control electronics.

7. The system set forth in claim 6 wherein said pedal includes a base and a pedal arm integrally molded with said base and cantilevered from said base, said sensor, said electronic circuitry and said connector being insert molded on said base.

8. The system set forth in claim 3 wherein said electronic circuitry is such that said hysteresis characteristics are variably programmable.

9. The system set forth in claim 3 wherein said pedal is of rigid construction, and said securement means is adapted to secure said pedal in fixed non-movable position in a vehicle.

10. An electronic foot pedal vehicle control system that comprises:
   a foot pedal of rigid one-piece integrally molded construction having a base, a pedal arm cantilevered from said base, and means on said base for securing said pedal to a vehicle at a position to be responsive to forces applied to said pedal arm by a vehicle operator, and
   an electronic subassembly insert molded into said base, and including a force sensor disposed on said base adjacent to said pedal arm for providing an electrical sensor signal as a function of force applied to said pedal arm by a vehicle operator and independently of pedal movement, and electronic circuitry responsive to said sensor signal for providing a pedal output signal to control at least one variable of vehicle operation.

11. The system set forth in claim 10 wherein said electronic subassembly includes a connector disposed on an external surface of said pedal for selective electrical connection to vehicle control electronics.

12. The system set forth in claim 11 wherein said electronic circuitry has electrically programmed hysteresis characteristics.

13. The system set forth in claim 10 wherein said foot pedal is of one-piece integrally molded plastic construction, and wherein said securement means is adapted to secure said pedal in fixed non-movable position on a vehicle.

14. An electronic foot pedal vehicle control system that comprises:
   a foot pedal of rigid one-piece integrally molded construction having a base, a pedal arm cantilevered from said base, and means on said base for securing said pedal. to a vehicle at a position to be responsive to forces applied to said pedal arm by a vehicle operator, and
   an electronic subassembly insert molded into said base, and including a force sensor disposed on said base adjacent to said pedal arm for providing an electrical sensor signal as a function of force applied to said pedal arm by a vehicle operator and electronic circuitry responsive to said sensor signal for providing a pedal output signal to control at least one variable of vehicle operation,
   said electronic subassembly including a connector disposed on an external surface of said pedal for selective electrical connection to vehicle control electronics.
   said electronic circuitry having electrically programmed hysteresis characteristics.

15. The system set forth in claim 14 wherein said electronic circuitry is such that said hysteresis characteristics are variably programmable.

16. The system set forth in claim 15 wherein said electronic circuitry includes a programmed microcomputer within which said hysteresis characteristics are variably programmable.

17. The system set forth in claim 16 wherein said foot pedal is of one-piece integrally molded plastic construction.

18. An electronic foot pedal assembly that includes:
   a foot pedal of rigid one-piece integrally molded plastic construction having a base, a pedal arm cantilevered from said base, and means on said base for securing said pedal to a vehicle at a position to be responsive to forces applied to said pedal arm by a vehicle operator, and
   an electronic subassembly insert molded into said foot pedal, and including a sensor for providing electrical sensor signals as a function of forces applied to said pedal arm by a vehicle operator, electronic circuitry responsive to said sensor signals for providing control signals, and an electrical connector at a surface of said base for providing said control signals to control vehicle operation.

\* \* \* \* \*